US011521405B2

(12) United States Patent
Singh et al.

(10) Patent No.: US 11,521,405 B2
(45) Date of Patent: Dec. 6, 2022

(54) GENERATING STRUCTURED REPRESENTATIONS OF FORMS USING MACHINE LEARNING

(71) Applicant: Intuit Inc., Mountain View, CA (US)

(72) Inventors: Anu Singh, San Francisco, CA (US);
Saikat Mukherjee, Fremont, CA (US);
Mritunjay Kumar, Bangalore (IN);
Karpaga Ganesh Patchirajan, Plano, TX (US)

(73) Assignee: Intuit Inc., Mountain View, CA (US)

( * ) Notice: Subject to any disclaimer, the term of this patent is extended or adjusted under 35 U.S.C. 154(b) by 86 days.

(21) Appl. No.: 17/244,586

(22) Filed: Apr. 29, 2021

(65) Prior Publication Data
US 2021/0264146 A1 Aug. 26, 2021

Related U.S. Application Data

(62) Division of application No. 16/569,297, filed on Sep. 12, 2019, now Pat. No. 11,048,933.

(30) Foreign Application Priority Data

Jul. 31, 2019 (IN) .............................. 201921030867

(51) Int. Cl.
*G06V 30/414* (2022.01)
*G06K 9/62* (2022.01)
*G06N 20/00* (2019.01)

(52) U.S. Cl.
CPC ......... *G06V 30/414* (2022.01); *G06K 9/6215* (2013.01); *G06N 20/00* (2019.01)

(58) Field of Classification Search
CPC .... G06V 30/414; G06V 30/413; G06V 30/10; G06V 30/412; G06V 10/82; G06V 30/1916; G06V 30/19173; G06V 30/40; G06V 30/416; G06K 9/6215; G06K 9/6218; G06N 20/00; G06N 5/022; G06N 3/08; G06N 3/0454; G06N 20/20; G06N 3/084;
(Continued)

(56) References Cited

U.S. PATENT DOCUMENTS

7,706,580 B2    4/2010   Houle et al.
7,716,225 B1    5/2010   Dean et al.
(Continued)

*Primary Examiner* — Michael S Osinski
(74) *Attorney, Agent, or Firm* — Ferguson Braswell Fraser Kubasta PC (57) ABSTRACT

A method may include acquiring, from an initial document having a document type, initial document elements and initial attributes, deriving initial features for the initial document elements using the initial attributes, detecting initial form components using the initial features, clustering the initial form components into initial line objects of an initial structured representation by applying an unsupervised machine learning model to the geometric attributes of the initial document elements, acquiring, from a next document having the document type, next document elements and next attributes describing the next document elements, deriving next features for the next document elements using the next attributes, detecting next form components using the next features, determining that the initial form components and the next form components are different, clustering the next form components into next line objects of a next structured representation, and replacing the initial structured representation with the next structured representation.

20 Claims, 8 Drawing Sheets

(58) Field of Classification Search
CPC ...... G06F 16/951; G06F 16/338; G06F 16/93;
G06F 16/9535; G06F 16/986; G06F
40/106; G06F 40/174; G06F 40/216;
G06F 40/284
See application file for complete search history.

(56) References Cited

U.S. PATENT DOCUMENTS

| | | |
|---|---|---|
| 9,111,140 B2 | 8/2015 | Stokes |
| 10,248,858 B2 | 4/2019 | Ho |
| 10,339,185 B2 | 7/2019 | Abou Mahmoud et al. |
| 10,387,531 B1 | 8/2019 | Vanhoucke |
| 10,546,054 B1 | 1/2020 | Foroughi et al. |
| 10,621,237 B1 | 4/2020 | Rathnavelu et al. |
| 10,798,236 B2 | 10/2020 | Stone |
| 2003/0037312 A1 | 2/2003 | Czech |
| 2003/0164979 A1 | 9/2003 | Shimakawa |
| 2005/0289121 A1 | 12/2005 | Nakamura et al. |
| 2009/0138466 A1 | 5/2009 | Henry et al. |
| 2009/0144277 A1 | 6/2009 | Trutner et al. |
| 2010/0076991 A1 | 3/2010 | Nakano et al. |
| 2010/0306249 A1 | 12/2010 | Hill et al. |
| 2014/0278448 A1 | 9/2014 | Sadeghi et al. |
| 2014/0316768 A1 | 10/2014 | Khandekar |
| 2015/0019382 A1 | 1/2015 | Shinzato |
| 2015/0093021 A1 | 4/2015 | Xu et al. |
| 2017/0193545 A1 | 7/2017 | Zhou et al. |
| 2018/0181808 A1 | 6/2018 | Sridharan |
| 2018/0218283 A1 | 8/2018 | Jenson |
| 2018/0374171 A1 | 12/2018 | Aizen et al. |
| 2019/0294921 A1 | 9/2019 | Kalenkov |
| 2020/0160050 A1 | 5/2020 | Bhotika et al. |
| 2020/0175267 A1 | 6/2020 | Schafer et al. |
| 2021/0012199 A1 | 1/2021 | Zhang et al. |
| 2021/0034853 A1 | 2/2021 | Matsumoto et al. |

Initial Document
300

Initial Document
Type
302

Schedule 1

T1-2018     Federal Tax

This schedule represents Step 5 in completing your return. Complete this schedule and attach it to your return.

Claim only the credits that apply to you.

The Income Tax and Benefit Guide may have additional information for certain lines.

Step A - Federal non-refundable tax credits

| | | |
|---|---|---|
| Basic personal amount | claim $11,809 300 | 1 |
| Age amount (if you were born in 1953 or earlier) (Complete the Worksheet for Schedule 1.) (maximum $7,333) 301+ | | 2 |
| Spouse or common-law partner amount (Complete Schedule 5.) 303+ | | 3 |
| Canada caregiver amount for spouse or common-law partner, or eligible dependant age 18 or older (Complete Schedule 5.) 304+ | | 4 |
| Amount for an eligible dependant (Complete Schedule 5.) 305+ | | 5 |
| Canada caregiver amount for other infirm dependants age 18 or older (Complete Shedule 5.) 307+ | | 6 |

Initial Document Element A 304A

Initial Document Element B 304B

Initial Document Element C 304C

Initial Document Element D 304D

GENERATING STRUCTURED REPRESENTATIONS OF FORMS USING MACHINE LEARNING

CROSS REFERENCE TO RELATED APPLICATIONS

The present application is a divisional application of and, thereby, claims benefit under 35 U.S.C. § 121 to U.S. application Ser. No. 16/569,297, entitled, "GENERATING STRUCTURED REPRESENTATIONS OF FORMS USING MACHINE LEARNING," filed on Sep. 12, 2019, having the same inventors, and incorporated herein by reference. The present application also claims priority to Indian Patent Application No. 201921030867, entitled, "GENERATING STRUCTURED REPRESENTATIONS OF FORMS USING MACHINE LEARNING," filed on Jul. 31, 2019 in the Indian Intellectual Property Office, under 35 U.S.C. § 119(a), having the same inventors, and incorporated herein by reference.

BACKGROUND

Software applications (e.g., financial management applications) may process a variety of online forms, such as compliance forms designed to comply with government regulations and into which users enter data. It would be advantageous to provide a capability to automatically generate a structured, machine-readable representation of a form embodied in a document. For example, the document may be represented in a structured file using the Portable Document Format (PDF). Such a capability could facilitate the development and maintenance of a knowledge base of forms. For example, such a capability may avoid the burden of explicitly updating a large number of online forms (e.g., forms used in a variety of jurisdictions) when the definitions of the forms are modified (e.g., when government regulations change). In addition, rule-based approaches to document processing are not scalable since rule-based approaches typically require adaptation of the rules when applied to different jurisdictions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including acquiring, from an initial document having a document type, initial document elements and initial attributes describing the initial document elements. One or more of the initial attributes are geometric attributes describing a placement of the corresponding initial document element within the initial document. The method further includes deriving initial features for the initial document elements using the initial attributes, detecting initial form components using the initial features, clustering the initial form components into initial line objects of an initial structured representation by applying an unsupervised machine learning model to the geometric attributes of the initial document elements, adding the initial structured representation to a repository, and acquiring, from a next document having the document type, next document elements and next attributes describing the next document elements. One or more of the next attributes are geometric attributes describing a placement of the corresponding next document element within the next document. The method further includes deriving next features for the next document elements using the next attributes, detecting next form components using the next features, determining that the initial form components and the next form components are different, and in response to determining that the initial form components and the next form components are different: clustering the next form components into next line objects of a next structured representation by applying the unsupervised machine learning model to the geometric attributes of the next document elements, and replacing, in the repository, the initial structured representation with the next structured representation.

In general, in one aspect, one or more embodiments relate to a system including a memory coupled to a computer processor, a repository configured to store an initial document having a document type and including initial document elements and initial attributes describing the initial document elements. One or more of the initial attributes are geometric attributes describing a placement of the corresponding initial document element within the initial document. The repository is further configured to store a next document having the document type and including next document elements and next attributes describing the next document elements. One or more of the next attributes are geometric attributes describing a placement of the corresponding next document element within the next document. The repository is further configured to store an initial structured representation including initial form components and initial line objects, a next structured representation including next form components and next line objects, and an unsupervised machine learning model. The system further includes a structured representation generator, executing on the computer processor and using the memory, configured to acquire, from the initial document, the initial document elements and the initial attributes, derive initial features for the initial document elements using the initial attributes, detect the initial form components using the initial features, cluster the initial form components into the initial line objects by applying the unsupervised machine learning model to the geometric attributes of the initial document elements, acquire, from the next document, the next document elements and the next attributes, derive next features for the next document elements using the next attributes, detect the next form components using the next features, determine that the initial form components and the next form components are different, and in response to determining that the initial form components and the next form components are different: cluster the next form components into the next line objects by applying the unsupervised machine learning model to the geometric attributes of the next document elements, and replace the initial structured representation with the next structured representation.

In general, in one aspect, one or more embodiments relate to a non-transitory computer readable medium including instructions that, when executed by a computer processor, perform acquiring, from an initial document having a document type, initial document elements and initial attributes describing the initial document elements. One or more of the initial attributes are geometric attributes describing a placement of the corresponding initial document element within the initial document. The instructions further perform deriving initial features for the initial document elements using the initial attributes, detecting initial form components using the initial features, clustering the initial form components into initial line objects of an initial structured representation by applying an unsupervised machine learning model to the geometric attributes of the initial document elements, adding the initial structured representation to a repository, and acquiring, from a next document having the document type, next document elements and next attributes describing the next document elements. One or more of the next attributes are geometric attributes describing a placement of the corresponding next document element within the next document. The instructions further perform deriving next features for the next document elements using the next attributes, detecting next form components using the next features, determining that the initial form components and the next form components are different, and in response to determining that the initial form components and the next form components are different: clustering the next form components into next line objects of a next structured representation by applying the unsupervised machine learning model to the geometric attributes of the next document elements, and replacing, in the repository, the initial structured representation with the next structured representation.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to generating a structured representation of a form. In one or more embodiments, document elements and attributes describing the document elements are acquired from a document. The document may be a file (e.g., a file represented using the Portable Document Format (PDF)). For example, the document may represent a compliance form (e.g., a tax form) to be completed by a user. Examples of document elements may include (i) chunks of text and (ii) shapes (e.g., rectangles or boxes that represent input fields). In one or more embodiments, attributes describing document elements include (i) textual attributes and (ii) geometric attributes indicating the placement of the document element within the document.

In one or more embodiments, the structured representation is a schema for a form that includes form components that are clustered into line objects. Examples of form components may include fields, field descriptions, field numbers, line descriptions, line numbers, etc.

In one or more embodiments, machine learning models are used to classify document elements as different types of form components using features derived from the attributes of the document elements. The features may be derived by aggregating, summarizing and/or applying statistical measurements to the textual and/or geometric attributes of the document elements. In one or more embodiments, the form components are clustered into line objects by applying an unsupervised machine learning model to the geometric attributes of the document elements.

In one or more embodiments, the structured representation may be used to populate a form. For example, the form may require values (e.g., obtained from a graphical user interface (GUI) or a database) corresponding to one or more form components of the structured representation. In one or more embodiments, the structured representation is updated in a knowledge base after processing a next document having the same document type as the initial document. For example, the next document may represent an updated version of a compliance form (e.g., audit form, data security form, tax form, medical form, privacy policy, etc.) represented by the initial document. Alternatively, the next document may be a version of the initial document that is adapted to a jurisdiction (e.g., State of New York, Country of Canada, etc.) different from a jurisdiction (e.g., State of California, Republic of Mexico, etc.) corresponding to the initial document. In this way, the structured representation may be continuously updated, as documents are processed.

Figure 1:
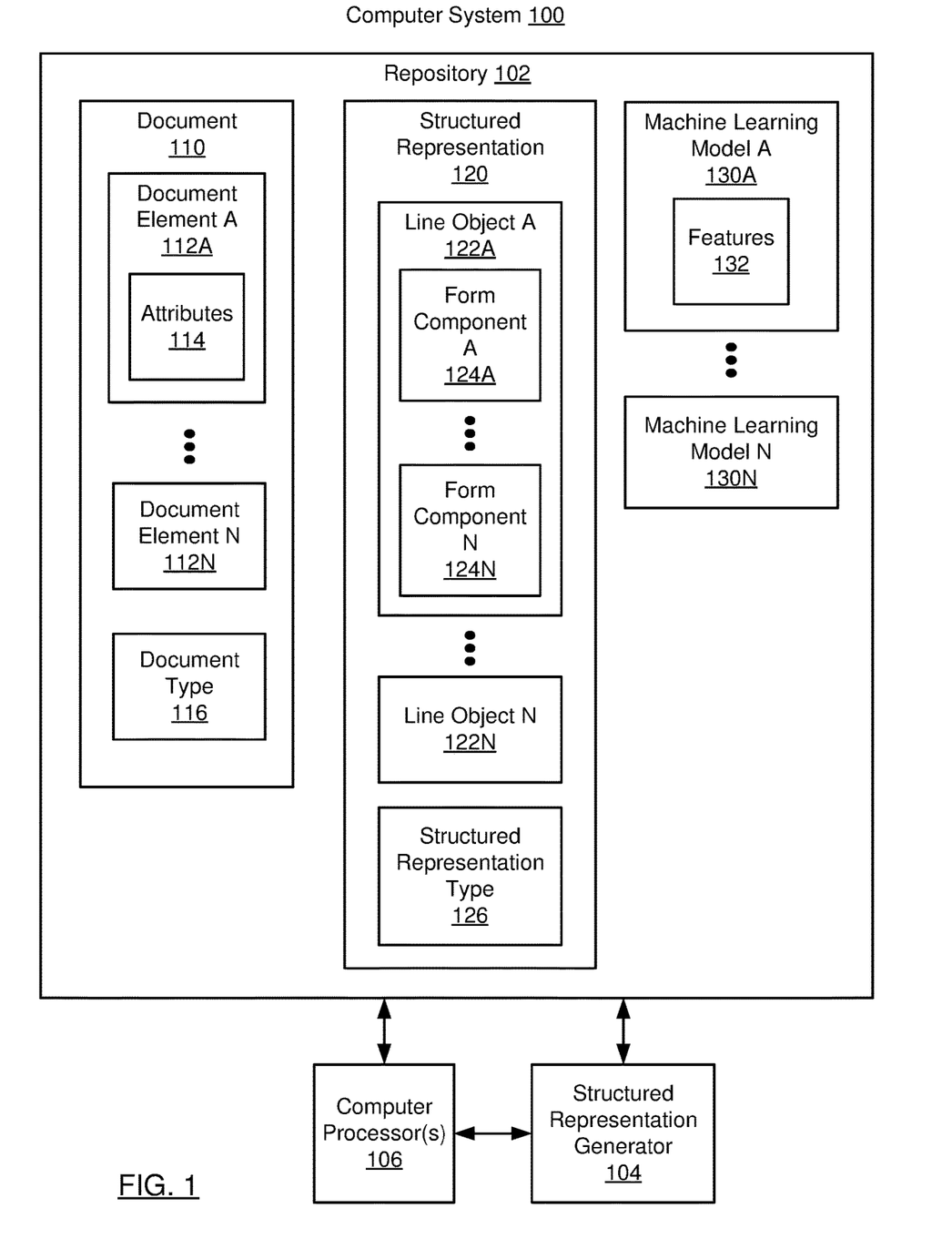
FIG. 1 shows a system in accordance with one or more embodiments of the invention.

FIG. 1 shows a system (100) in accordance with one or more embodiments of the invention. As shown in FIG. 1, the computer system (100) includes a repository (102), a structured representation generator (104), and one or more computer processors (106). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (106) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes a document (110), a structured representation (120), and machine learning models (130A, 130N). In one or more embodiments, the document (110) is a file that may be represented using the Portable Document Format (PDF), HyperText Markup Language (HTML), eXtensible Markup Language (XML), JavaScript Object Notation (JSON), or any other file format. For example, the document (110) may represent a compliance form (e.g., audit form, data security form, tax form, medical form, privacy policy, etc.) to be completed by a user, and designed to comply with the regulations of a government agency. Continuing this example, the compliance form may be specific to a jurisdiction (e.g., a geographic region such as a state, country, region, municipality, reinvestment zone, etc.).

Continuing with FIG. 1, the document (110) includes document elements (112A, 112N) and a document type (116) in accordance with one or more embodiments of the invention. A document element (112A) may be a component of the document (110). A document element (112A) may be a chunk of text. Alternatively, a document element (112A) may be a shape (e.g., a line or rectangle), an image (e.g., a bitmap), etc. For example, a document element (112A) may be a rectangle or box that represents an input field. In one or more embodiments, a document element (112A) includes attributes (114) that describe the document element (112A). The attributes (114) may be textual attributes such as font, font size, number of characters (e.g., broken down into the number of numeric characters and the number of alphabetic characters), number of words, etc. In one or more embodiments, the attributes (114) include geometric attributes indicating the placement of the document element (112A) within the document (110). In one or more embodiments, the placement may be expressed in terms of a region (e.g., a rectangle) in a coordinate system (e.g., Cartesian coordinates within the document (110)), where the region encompasses the document element (112A). In one or more embodiments, the placement may be used to calculate distances between document elements (112A, 112N).

In one or more embodiments, the document type (116) is a category that describes the document (110). For example, the document type (116) may be a general category, such as tax document, payroll document, or legal document. Alternatively, the document type (116) may be a specific category, such as Schedule 1 of a Federal Tax Form, etc.

Figure 3A:
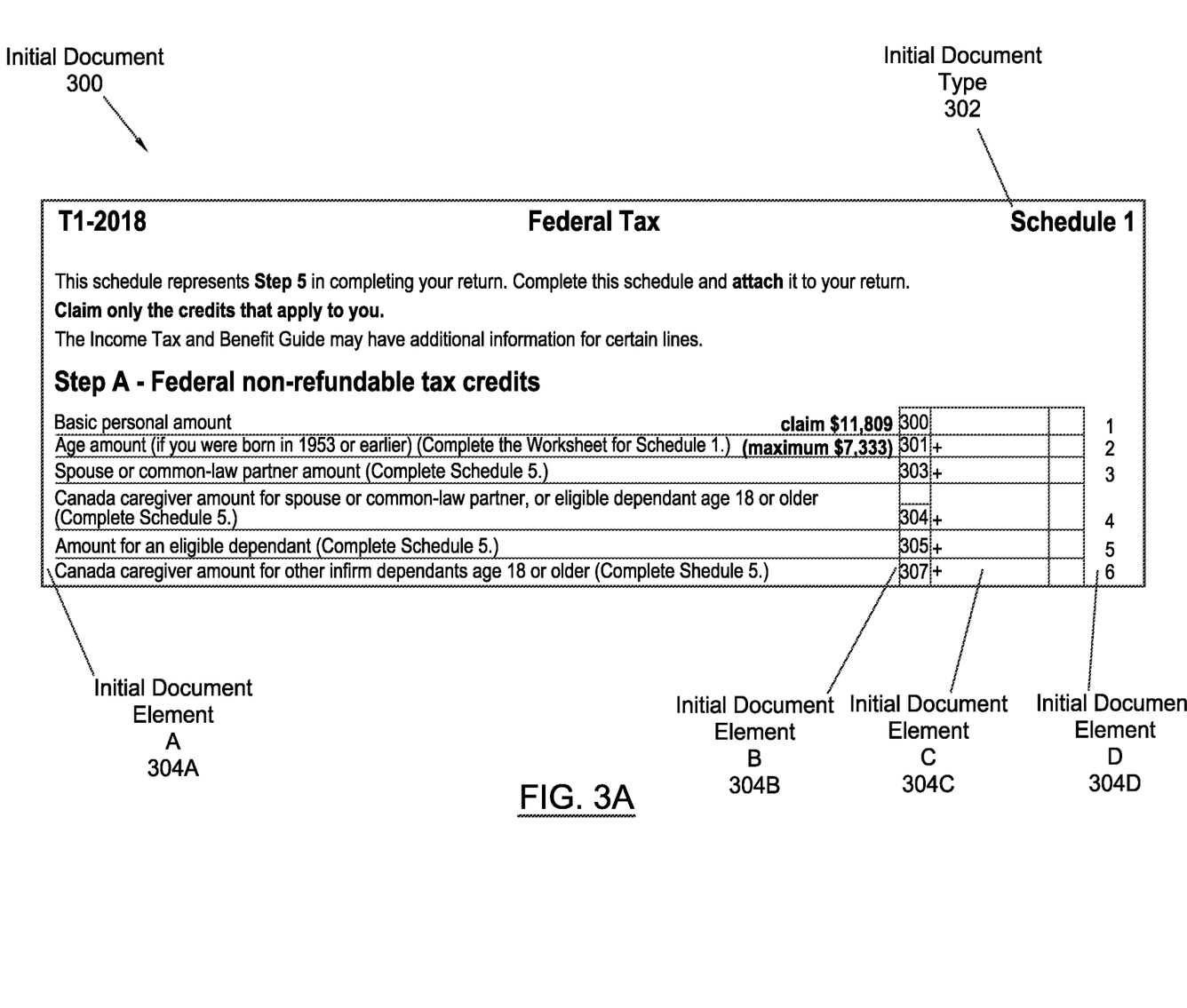
FIG. 3A, FIG. 3B, FIG. 4A, and FIG. 4B show examples in accordance with one or more embodiments of the invention.
Figure 3B:
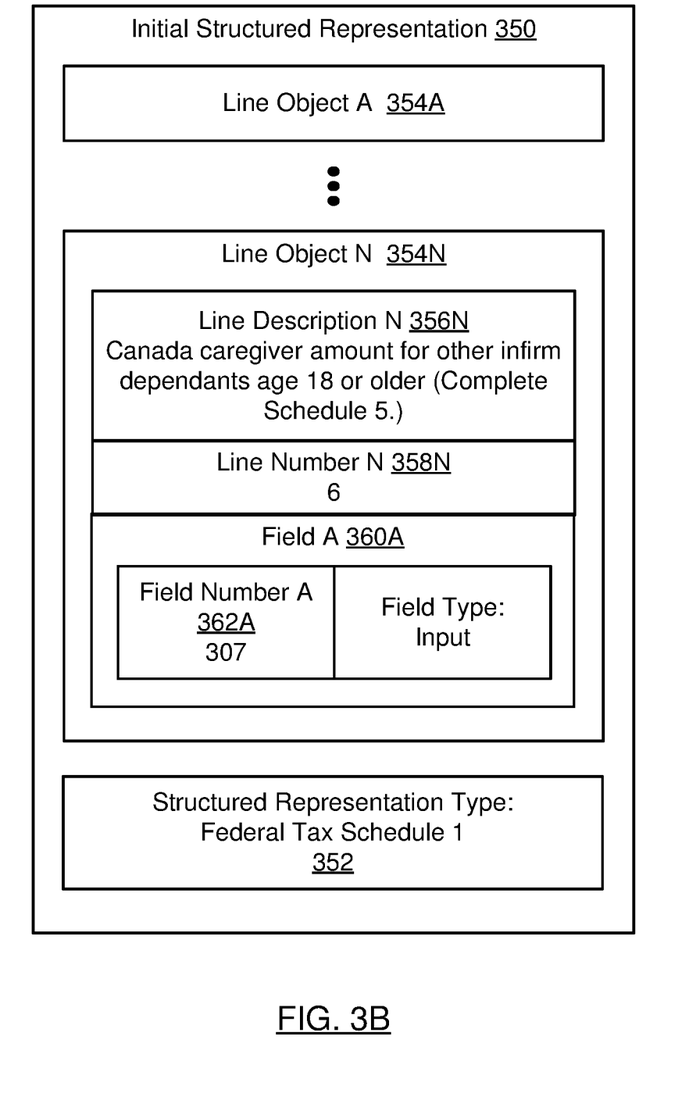

In one or more embodiments, the structured representation (120) is a schema for a form. For example, the schema may be represented using JSON or XML. In one or more embodiments, the structured representation (120) includes line objects (122A, 122N) and a structured representation type (126). A line object (122A) may include one or more form components (124A, 124N). A form component (124A) may be any component of the structured representation (120). Examples of form components (124A, 124N) may include line descriptions, line numbers, fields, field numbers, field descriptions, etc. (e.g., as illustrated in the initial structured representation (350) of FIG. 3B and the next structured representation (450) of FIG. 4B). A form component (124A) may include other form components. For example, as illustrated in FIG. 3B, a field (360A) may include a field number (362A). In one or more embodiments, a form component (124A) includes line objects (122A, 122N). For example, a "section" form component or "page" form component may include several line objects (122A, 122N). In one or more embodiments, a value is assigned to a form component (124A). For example, the value may be a text value, numeric value, check mark, etc.

In one or more embodiments, a line object (122A) corresponds to a placement within the document (110). For example, a line object (122A) may correspond to a placement (e.g., a line) within the document (110) that is within a threshold distance of the placements (e.g., regions) of the document elements (112A, 112N) corresponding to one or more form components (124A, 124N).

In one or more embodiments, the structured representation type (126) is a category that describes the structured representation (120). The structured representation type (126) may correspond to the document type (116) of a document (110). For example, the structured representation type (126) may be a general category, such as tax document, payroll document, or legal document. Alternatively, the structured representation type (126) may be a specific category, such as Schedule 1 of a Federal Tax Form, etc. In one or more embodiments, the structured representations (120) included in the repository (102) may be accessed (e.g., queried) using the structured representation type (126).

In one or more embodiments, the machine learning models (130A, 130N) include supervised models with functionality to classify document elements (112A, 112N) as different types of form components (124A, 124N). For example, one machine learning model may classify a document element (112A) as a "description" form component (e.g., field description, line description, etc.). As another example, a machine learning model may classify a document element (112A) as a "number" form component (e.g., field number, line number, etc.). As yet another example, a machine learning model may classify a document element (112A) as an "input field" form component. As another example, a machine learning model may classify a document element (112A) as a "section header" form component. The supervised models may be trained using document elements (112A, 112N) labeled as various types of form components (124A, 124N). For example, a "checkbox" may be a type of "input field" form component. Continuing this example, based on the training data, the checkbox may correspond to a document element (112A) with a geometric attribute of "rectangle". Alternatively or additionally, based on the training data, the checkbox may correspond to a set of four document elements each described by a geometric attribute of "line", such that the set of document elements satisfy a constraint. For example, the constraint may be that each document element in the set forms a right angle with two of the other document elements in the set.

In one or more embodiments, the machine learning models (130A, 130N) include functionality to perform the classification using features (132) derived from the attributes (114) of the document elements (112A, 112N). For example, the features (132) may be based on aggregating or summarizing the attributes (114) of the document elements (112A, 112N). As another example, the features (132) may be based on statistical measurements applied to the attributes (114) of the document elements (112A, 112N). Alternatively, the features (132) may represent any distinguishing characteristics corresponding to the attributes (114).

In one or more embodiments, the machine learning models (130A, 130N) are implemented as classifiers using XGBoost (available at https://github.com/dmlc/xgboost). Alternatively, the machine learning models (130A, 130N) may be implemented as k-nearest neighbor (k-NN) classifiers. Still alternatively, the machine learning models (130A, 130N) may be implemented as various types of deep learning classifiers, such as a neural network classifier (e.g., based on convolutional neural networks (CNNs)), random forest classifier, SGD classifier, lasso classifier, gradient boosting classifier, bagging classifier, ada boost classifier, ridge classifier, elastic net classifier, or NuSVR classifier. Deep learning, also known as deep structured learning or hierarchical learning, is part of a broader family of machine learning methods based on learning data representations, as opposed to task-specific algorithms.

In one or more embodiments, the machine learning models (130A, 130N) include an unsupervised model with functionality to cluster form components (124A, 124N) (e.g., form components (124A, 124N) detected by the supervised models) into line objects (122A, 122N). In one or more embodiments, the unsupervised model may use a variety of techniques (e.g., k-means clustering, centroid-based clustering, hierarchical clustering, distribution-based clustering, density-based clustering, naïve Bayes, etc.) to perform the clustering. The unsupervised model may include functionality to perform the clustering using a distance measure based on attributes (114) (e.g., geometric attributes) of document elements (112A, 112N) corresponding to the form components (124A, 124N). For example, the distance measure may be based on a Cartesian distance between the boundaries of the document elements (112A, 112N). Continuing this example, form components (124A, 124N) whose corresponding document elements (112A, 112N) are within a threshold distance of each other may be clustered with the same line object (122A). Further continuing this example, the document elements (112A, 112N) may also be within a threshold distance of the Cartesian coordinates of a placement (e.g., a line in the Cartesian plane) within the document (110) corresponding to the line object (122A). In one or more embodiments, the unsupervised model may include functionality to associate form components (124A, 124N) within a line object (122A) using a distance measure.

In one or more embodiments, the unsupervised model may include functionality to associate multiple line objects (122A, 122N) using a distance measure. For example, multiple line objects (122A, 122N) may be clustered into a larger form component (e.g., a section or page that includes the multiple line objects (122A, 122N)).

In one or more embodiments, the structured representation generator (104) may be implemented in hardware (e.g., circuitry), software, firmware, and/or any combination thereof. The structured representation generator (104) may include functionality to acquire document elements (112A, 112N) and attributes (114) describing the document elements (112A, 112N) from a document (110). In one or more embodiments, the structured representation generator (104) includes functionality to derive features (132) using the attributes (114) of document elements (112A, 112N). The structured representation generator (104) may include functionality to generate a structured representation (120). The structured representation generator (104) may include functionality to replace a structured representation (120) stored in the repository (102). In one or more embodiments, the computer processor (106) includes functionality to execute the structured representation generator (104).

While FIG. 1 shows a configuration of components, other configurations may be used without departing from the scope of the invention. For example, various components may be combined to create a single component. As another example, the functionality performed by a single component may be performed by two or more components.

Figure 2A:
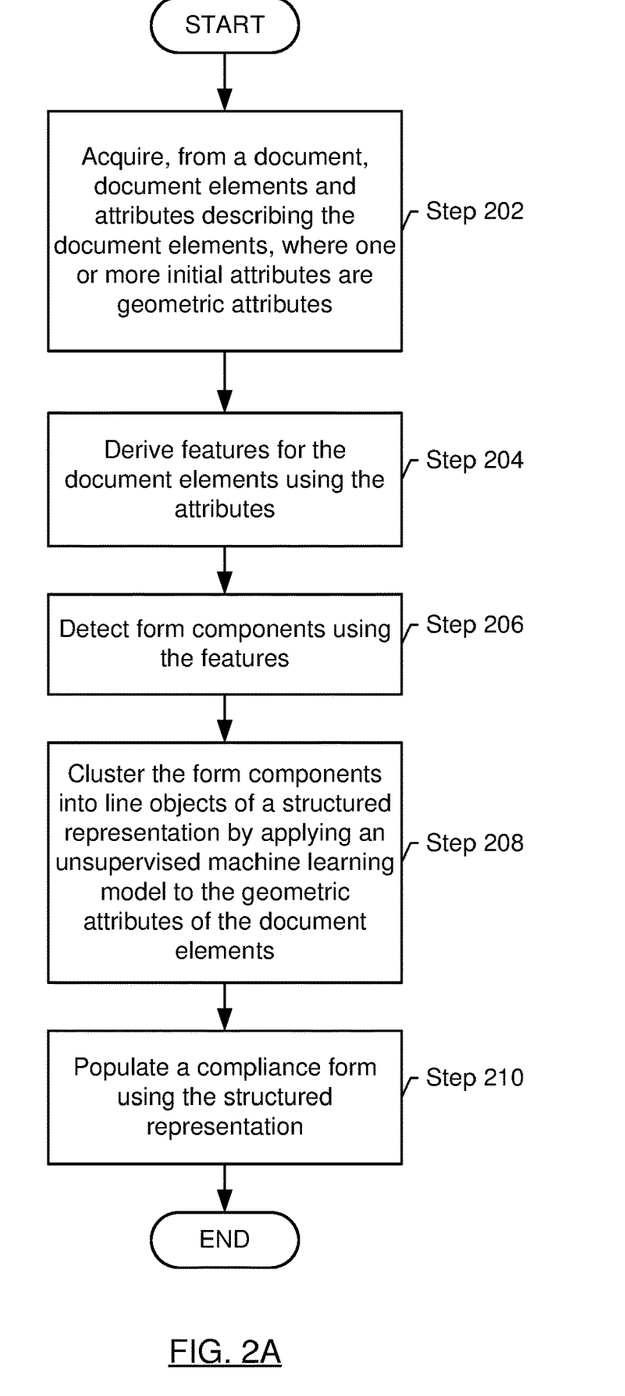
FIG. 2A and FIG. 2B show flowcharts in accordance with one or more embodiments of the invention.

FIG. 2A shows a flowchart in accordance with one or more embodiments of the invention. The flowchart depicts a process for generating a structured representation of a form. One or more of the steps in FIG. 2A may be performed by the components (e.g., the structured representation generator (104) and the machine learning models (130A, 130N) of the system (100)) discussed above in reference to FIG. 1. In one or more embodiments, one or more of the steps shown in FIG. 2A may be omitted, repeated, and/or performed in parallel, or in a different order than the order shown in FIG. 2A. Accordingly, the scope of the invention should not be considered limited to the specific arrangement of steps shown in FIG. 2A.

Initially, in Step 202, document elements and attributes describing the document elements are acquired from a document. The structured representation generator may obtain the document from a repository. In one or more embodiments, the structured representation generator acquires the document elements and the attributes from the document using a software tool. For example, the structured representation generator may use a PDF mining tool to extract, from a document represented in PDF, document elements and attributes describing the document elements.

In Step 204, features for the document elements are derived using the attributes. For example, the features may be derived by aggregating, summarizing and/or applying statistical measurements to the textual and/or geometric attributes of the document elements.

In Step 206, form components are detected using the features. The structured representation generator may apply machine learning models to the features to detect the form components. For example, each type of form component may be detected by a machine learning model that is trained to detect that particular type of form component.

In Step 208, the form components are clustered into line objects of a structured representation by applying an unsupervised machine learning model to the geometric attributes of the document elements. In one or more embodiments, the unsupervised machine learning model clusters the form components using a distance measure based on the geometric attributes of the document elements corresponding to the form components. For example, the unsupervised machine learning model may cluster, into a line object, form components corresponding to document elements whose placement (e.g., region) within the document is within a threshold distance of a y-coordinate value of a line corresponding to the line object. Continuing this example, the form components may include multiple "field" form components. Further continuing this example, the multiple "field" form components may correspond to cells in a row of a table, such that the line object corresponds to the row of the table.

In one or more embodiments, the unsupervised machine learning model associates, within a line object, multiple form components using a distance measure based on the geometric attributes of the document elements corresponding to the multiple form components. For example, the unsupervised machine learning model may associate a "field" form component with a "field description" form component clustered within the same line object when the regions (e.g., the x-coordinates of the regions) corresponding to the document elements corresponding to the field form component and the field description form component are within a threshold distance of each other.

In one or more embodiments, the unsupervised machine learning model associates multiple line objects together using a distance measure based on the placements within the document corresponding to the multiple line objects. For example, the unsupervised machine learning model may associate multiple line objects with a "section" form component when the placements corresponding to the multiple line objects are within a threshold distance of a "section header" form component that is included in the "section" form component. Similarly, the unsupervised machine learning model may associate multiple line objects with a "table" form component when the placements corresponding to the multiple line objects are within a threshold distance of a "table header" form component that is included in the "table" form component.

In Step 210, a compliance form is populated using the structured representation. For example, the compliance form may be an instance of the structured representation such that the compliance form requires values corresponding to one or more of the form components of the structured representation. In one or more embodiments, the values are obtained corresponding to one or more of the form components (e.g., "input field" form components) of the structured representation. The compliance form may then be populated using the values obtained for the form components. In one or more embodiments, the values are obtained from a graphical user interface (GUI) with functionality to receive input from a user. Alternatively, the values may be obtained from a database. For example, the value for a form component of a structured representation whose structured representation type is "W2 form" may be obtained from a payroll database.

Figure 4A:
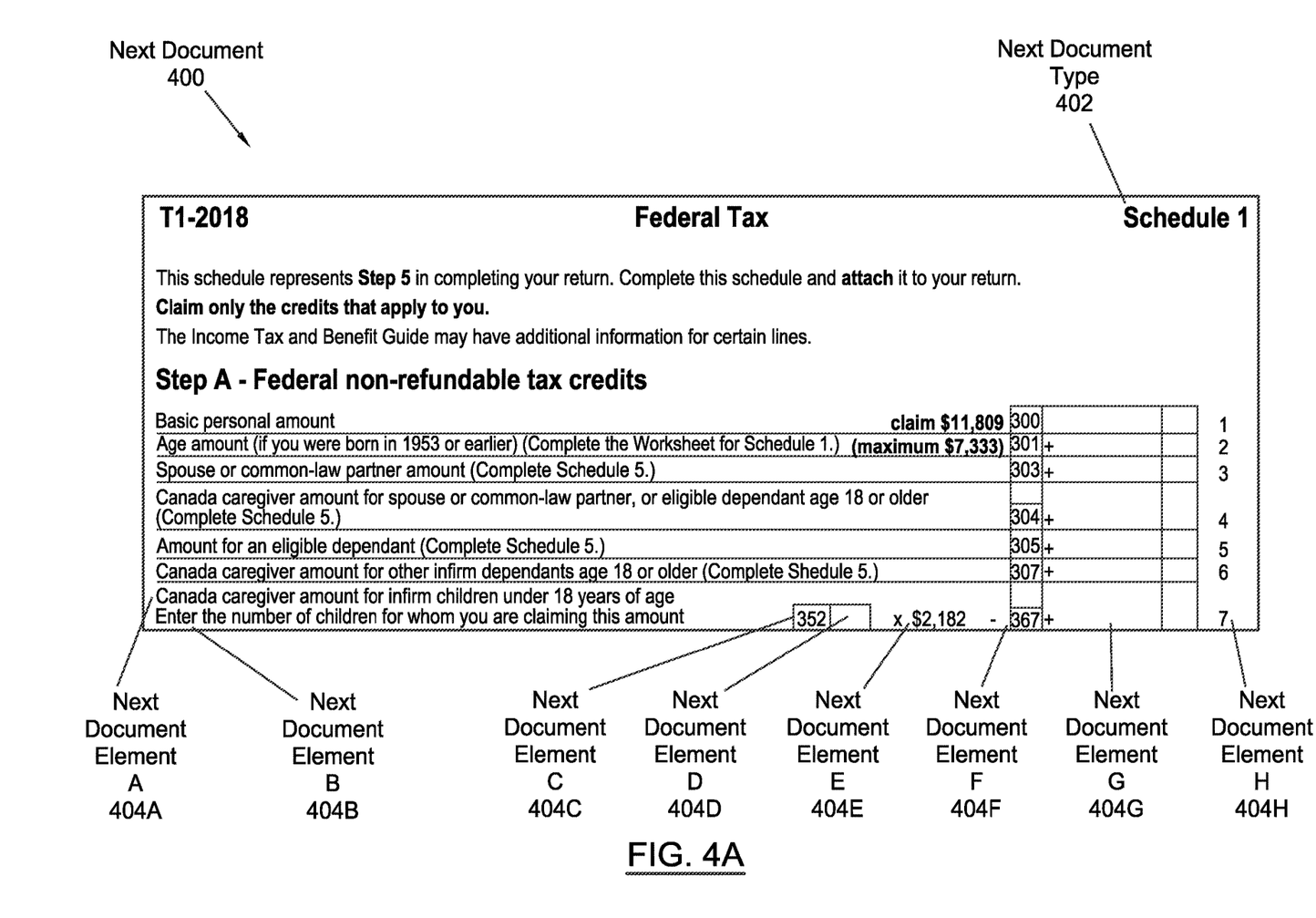

In one or more embodiments, multiple form components are associated to represent a calculation. In one or more embodiments, the compliance form is populated by performing the calculation using values corresponding to the multiple form components. For example, the value for a "calculated" form component may be calculated using a numerical value obtained for a "input" form component and a numerical value included in a "description" form component. Continuing this example, the description form component may include a numerical value to be multiplied by the value of the input form component to calculate the calculated form component. FIG. 4A illustrates this scenario, where next document element D (404D) corresponds to the input form component, next document element E (404E) corresponds to the description form component that includes a multiplicative factor of $2182, and next document element G (404G) corresponds to the calculated form component.

Figure 2B:
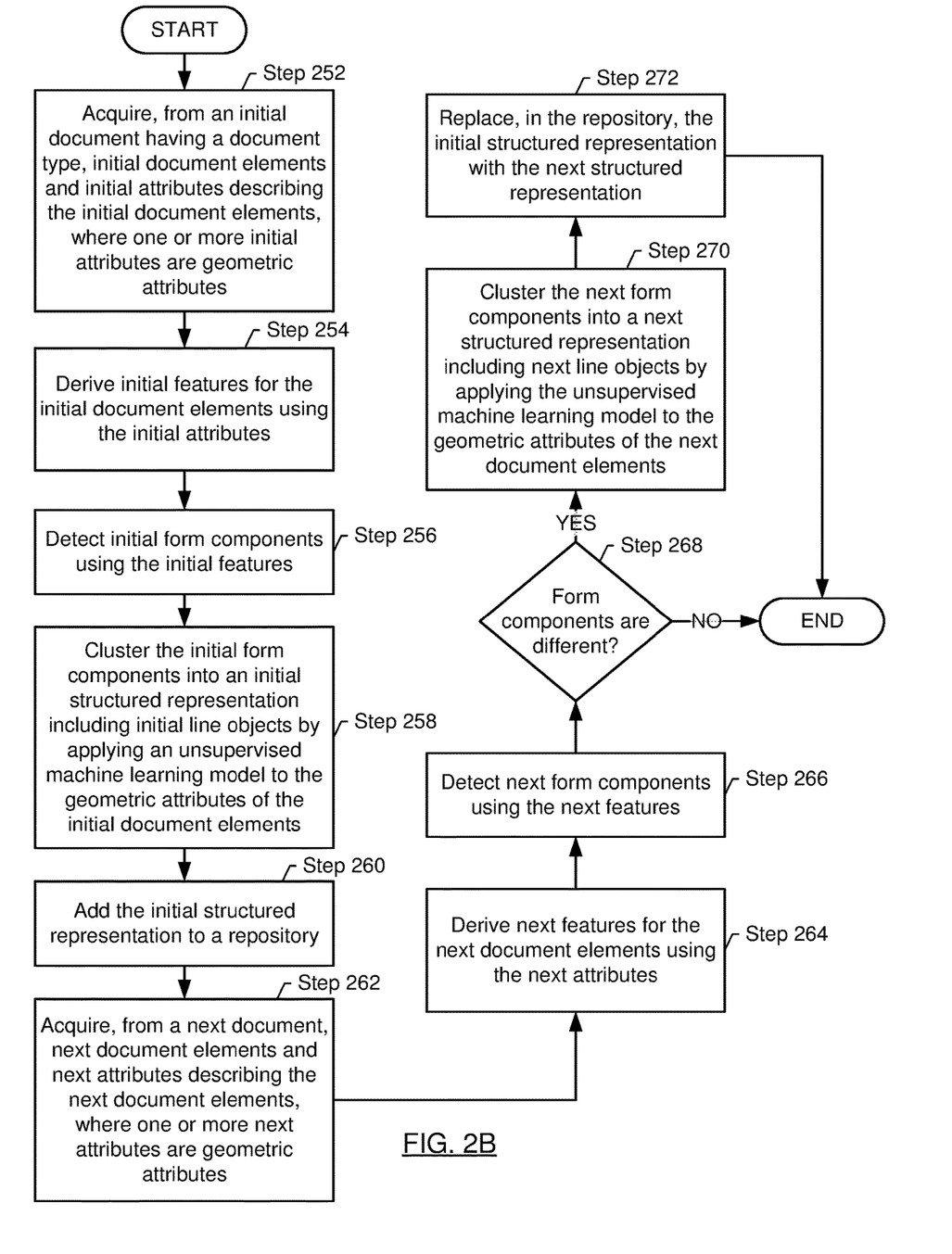

FIG. 2B shows a flowchart in accordance with one or more embodiments of the invention. The flowchart depicts a process for process for generating a structured representation of a form. One or more of the steps in FIG. 2B may be performed by the components (e.g., the structured representation generator (104) and the machine learning models (130A, 130N)) of the system (100)) discussed above in reference to FIG. 1. In one or more embodiments, one or more of the steps shown in FIG. 2B may be omitted, repeated, and/or performed in parallel, or in a different order than the order shown in FIG. 2B. Accordingly, the scope of the invention should not be considered limited to the specific arrangement of steps shown in FIG. 2B.

Initially, in Step 252, initial document elements and initial attributes describing the initial document elements are acquired from an initial document (see description of Step 202 above). The initial document may have a document type (e.g., a type of compliance form).

In Step 254, initial features for the initial document elements are derived using the initial attributes (see description of Step 204 above).

In Step 256, initial form components are detected using the initial features (see description of Step 206 above).

In Step 258, the initial form components are clustered into initial line objects of an initial structured representation by applying an unsupervised machine learning model to the geometric attributes of the initial document elements (see description of Step 208 above).

In Step 260, the initial structured representation is added to a repository. In one or more embodiments, the repository serves as a knowledge base of structured representations. For example, the structured representations in the repository may be used to populate compliance forms. In one or more embodiments, the initial structured representation corresponds to a jurisdiction. For example, the jurisdiction may be a geographic region (e.g., a country, state, city, province, etc.). In one or more embodiments, the structured representations included in the repository may be accessed (e.g., queried) using the structured representation type.

In Step 262, next document elements and next attributes describing the next document elements are acquired from a next document (see description of Step 252 above). The next document may have the same document type as the initial document. For example, the next document may represent an updated version of a compliance form represented by the initial document. Alternatively, the next document may be a version of the initial document that is adapted to a jurisdiction different from a jurisdiction corresponding to the initial document.

In Step 264, next features for the next document elements are derived using the next attributes (see description of Step 254 above).

In Step 266, next form components are detected using the next features (see description of Step 256 above).

If, in Step 268, a determination is made that the initial form components and the next form components are different, then Step 270 below is executed. In one or more embodiments, the initial form components and the next form components are different when at least one of the following is true:
 1) the next form components include a form component that is not present in the initial form components (e.g., the next form components include a field that is not present in the initial form components),
 2) the initial form components include a form component that is not present in the next form components (e.g., the next form components omit a field that was present in the initial form components), or
 3) the next form components include a form component that is a modified version of one of the initial form components (e.g., the next form components modify a field description that was present in the initial form components).

In Step 270, the next form components are clustered into next line objects of a next structured representation by applying the unsupervised machine learning model to the geometric attributes of the next document elements (see description of Step 258 above). In one or more embodiments, the next line objects include a line object that is not present in the initial line objects. For example, one or more new fields present in the next form components, but not present in the initial form components, may be clustered into a new line object. In one or more embodiments, the initial line objects include a line object that is not present in the next line objects. For example, the form components comprising one of the initial line objects may be omitted in the next form components. In one or more embodiments, the next line objects include a line object that is a modified version of one of the initial line objects. For example, a form component in one of the next line objects may be a modified version of a form component in one of the initial line objects.

In Step 272, the initial structured representation is replaced with the next structured representation in the repository. For example, the next structured representation may representation an updated version of the initial structured representation. In other words, the initial structured representation may be updated automatically, based on the processing the next document, via the process described in FIG. 2B. Alternatively, the next structured representation may be a version of the initial structured representation that is adapted to a jurisdiction different from a jurisdiction corresponding to the initial structured representation.

The following example is for explanatory purposes only and not intended to limit the scope of the invention. FIG. 3A, FIG. 3B, FIG. 4A, and FIG. 4B show an implementation example in accordance with one or more embodiments of the invention. FIG. 3A shows an initial document (300) ((110) in FIG. 1) represented in PDF with an initial document type (302) ((116) in FIG. 1). Initially, the structured representation generator ((104) in FIG. 1) acquires initial document elements (e.g., 304A, 304B, 304C, 304D) ((112A, 112N) in FIG. 1) from the initial document (300) using a PDF mining tool. The PDF mining tool also extracts textual and geometric attributes describing the initial document elements (304A, 304B, 304C, 304D). The geometric attributes include Cartesian coordinates of the initial document elements (304A, 304B, 304C, 304D) within the initial document (300). Next, the structured representation generator derives features for the initial document elements (304A, 304B, 304C, 304D) based on aggregating the attributes of the initial document elements (304A, 304B, 304C, 304D).

The structured representation then generates initial structured representation (350), shown in FIG. 3B. The structured representation generator applies machine learning models ((130A, 130N) in FIG. 1) to the features to detect initial form components ((124A, 124N) in FIG. 1) corresponding to the initial document elements (304A, 304B, 304C, 304D). The initial form components include a line description (356N), a line number (358N), a field (360N), and a field number (362N). Next, the structured representation generator clusters the form components into line objects (354A, 354N) of an initial structured representation (350) by applying an unsupervised machine learning model to the geometric attributes of the initial document elements (e.g., 304A, 304B, 304C, 304D). The initial structured representation (350) has a structured representation type (352) ((126) in FIG. 1) that corresponds to the initial document type (302) of the initial document (300) shown in FIG. 3A.

FIG. 3B shows the initial form components that have been clustered into line object N (354N): line description N (356N) corresponding to initial document element A (304A), line number N (358N) corresponding to initial document element D (304D), field A (360A) corresponding to initial document element C (304C), and field number A (362A) corresponding to initial document element B (304B). The unsupervised machine learning model clusters the initial form components into line object N (354N) using a distance measure based on the geometric attributes of the initial document elements (304A, 304B, 304C, 304D) corresponding to the initial form components.

The unsupervised machine learning model then associates field A (360A) with field number A (362A) using a distance measure based on the geometric attributes of the initial document elements (304C, 304B) corresponding to field A (360A) and field number A (362A), respectively. That is, the unsupervised machine learning model determines that the two document elements (304C, 304B) are within a threshold distance of each other within the initial document (300).

The structured representation generator then adds the initial structured representation (350) to a repository ((102) in FIG. 1) that functions as a knowledge base of structured representations. An initial instance of the Federal Tax Schedule 1 form is then populated using the initial structured representation (350). For example, a value for field A (360A), an input field, is received via a graphical user interface (GUI).

Next, as shown in FIG. 4A, the structured representation generator acquires next document elements (e.g., 404A, 404B, 404C, 404D, 404E, 404F, 404G, 404H) from a next document (400) using the PDF mining tool. The next document type (402) matches the initial document type (302) of the initial document (300) shown in FIG. 3A. The next document (400) represents an updated version of the Federal Tax Schedule 1 form that includes a new row of next document elements (404A, 404B, 404C, 404D, 404E, 404F, 404G, 404H). The PDF mining tool extracts textual and geometric attributes describing the next document elements (404A, 404B, 404C, 404D, 404E, 404F, 404G, 404H). Next, the structured representation generator derives features for the next document elements (404A, 404B, 404C, 404D, 404E, 404F, 404G, 404H) based on aggregating the attributes of the next document elements (404A, 404B, 404C, 404D, 404E, 404F, 404G, 404H).

Figure 4B:
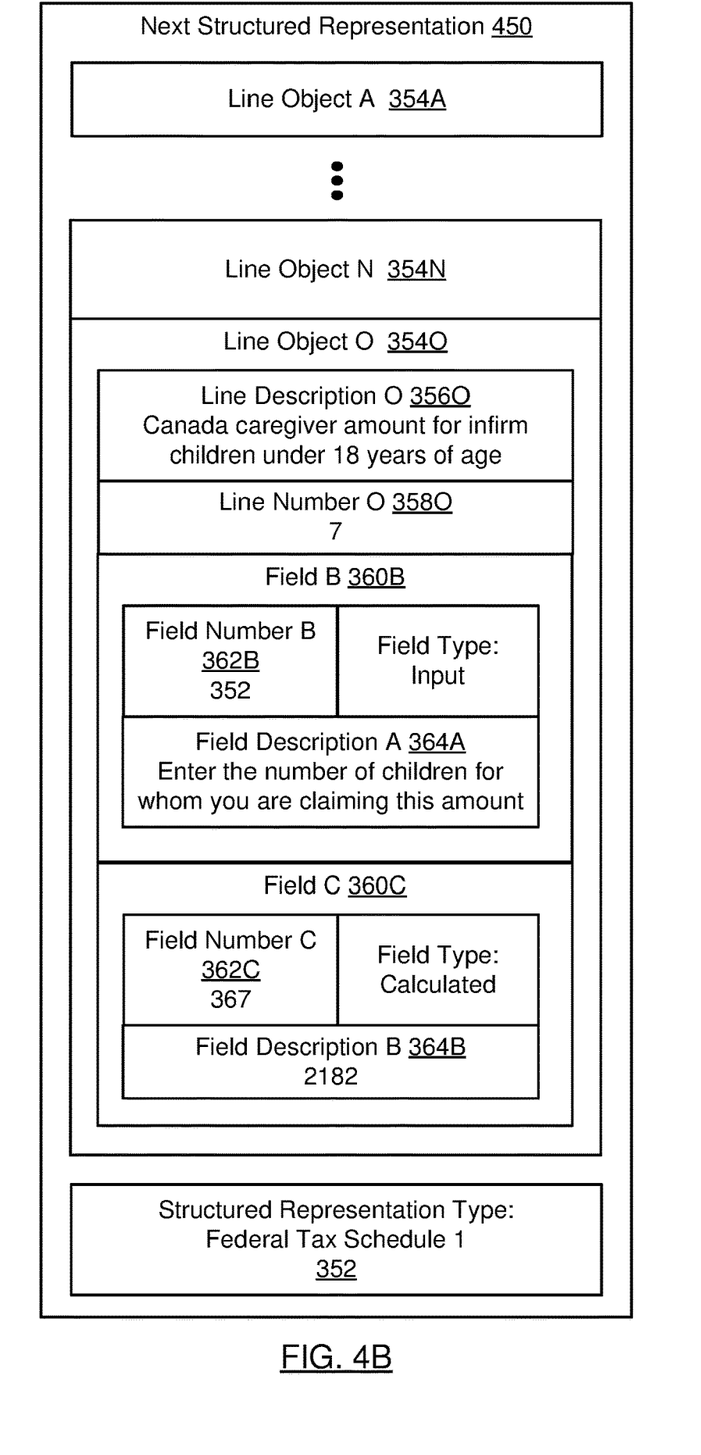

The structured representation generator then applies the machine learning models to the features to detect next form components corresponding to the next document elements (404A, 404B, 404C, 404D, 404E, 404F, 404G, 404H). As shown in FIG. 4B, the next form components include a line description (356O), a line number (358O), two fields (360B, 360C), two field numbers (362B, 362C), and two field descriptions (364A, 364B). The structured representation generator determines that the next form components and the initial form components are different since the next form components include several form components not present in the initial form components.

As illustrated in FIG. 4B, the structured representation generator then clusters the next form components into line objects (354A, 354O) of a next structured representation (450) by applying the unsupervised machine learning model to the geometric attributes of the next document elements (404A, 404B, 404C, 404D, 404E, 404F, 404G, 404H). FIG. 4B shows the next form components that have been clustered into line object O (354O), a line object that is not present in the line objects (354A, 354N) of the initial structured representation (350) illustrated in FIG. 3B. Line object O (354O) includes the following form components: a line description (356O) corresponding to next document element A (404A), a line number (358O) corresponding to next document element H (404H), a field (360B) corresponding to next document element D (404D), a field number (362B) corresponding to next document element C (404C), a field description (364A) corresponding to next document element B (404B), a field (360C) corresponding to next document element G (404G), a field number (362C) corresponding to next document element F (404F), and a field description (364B) corresponding to next document element E (404E). The unsupervised machine learning model clusters the next form components into line object O (354O) using a distance measure based on the geometric attributes of the next document elements (404A, 404B, 404C, 404D, 404E, 404F, 404G, 404H) corresponding to the next form components.

The unsupervised machine learning model then associates field B (360B) with field number B (362B) and field description A (364A) using a distance measure based on the geometric attributes of the next document elements (404D, 404C, 404B) corresponding to field B (360B), field number B (362B), and field description A (364A), respectively. Similarly, the unsupervised machine learning model then associates field C (360C) with field number C (362C) and field description B (364B) using a distance measure based on the geometric attributes of the next document elements (404G, 404F, 404E) corresponding to field C (360C), field number C (362C), and field description B (364B), respectively.

The structured representation generator replaces the initial structured representation (350) of FIG. 3B with the next structured representation (450) of FIG. 4B in the repository. A second instance of the Federal Tax Schedule 1 form is then populated using the next structured representation (450). For example, a value for field B (360B), an input field, is received via a GUI. Then, a value for field C (360C), a calculated field, is calculated using the value received for field B (360B) and the numeric value of field description B (364B), which is $2182, as shown in FIG. 4B.

Figure 5A:
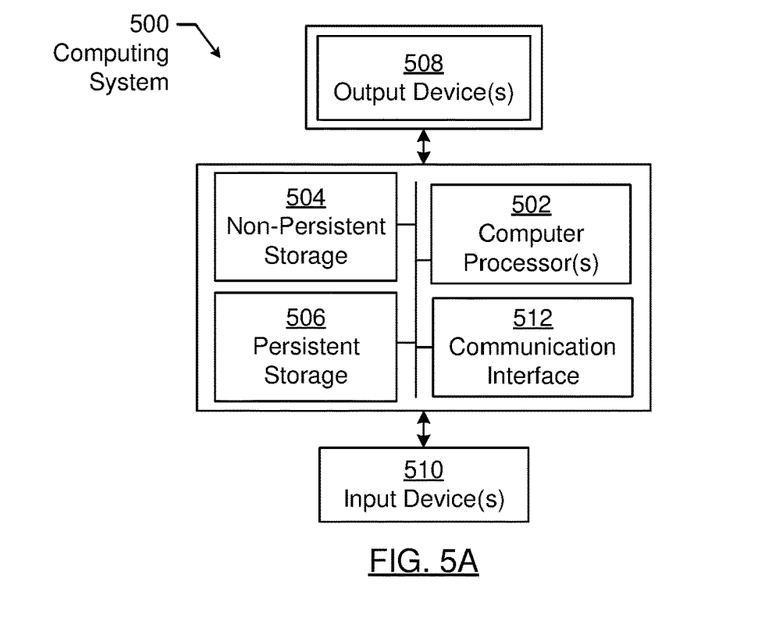
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
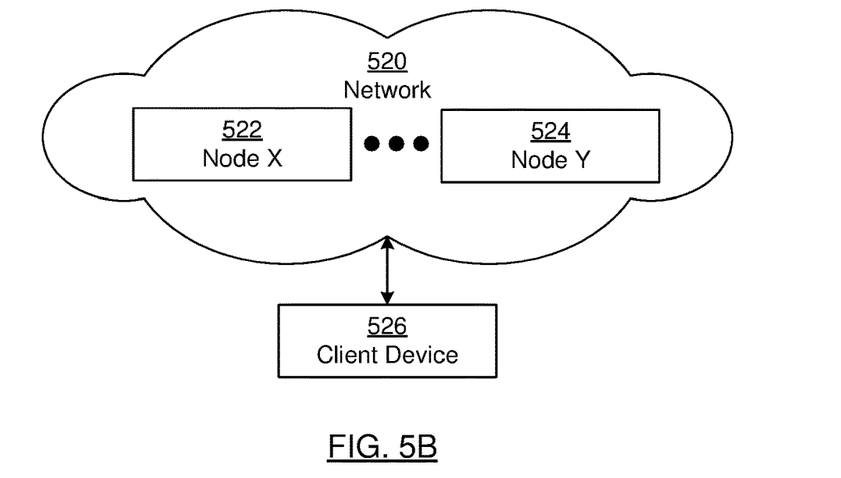

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready.

An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   acquiring, from an initial document having a document type, an initial plurality of document elements and initial attributes describing the initial plurality of document elements, wherein one or more of the initial attributes are geometric attributes describing a placement of the corresponding initial document element within the initial document;
   deriving initial features for the initial plurality of document elements using the initial attributes;
   detecting an initial plurality of form components using the initial features;
   clustering the initial plurality of form components into an initial plurality of line objects of an initial structured representation by applying an unsupervised machine learning model to the geometric attributes of the initial plurality of document elements;
   adding the initial structured representation to a repository;
   acquiring, from a next document having the document type, a next plurality of document elements and next attributes describing the next plurality of document elements, wherein one or more of the next attributes are geometric attributes describing a placement of the corresponding next document element within the next document;
   deriving next features for the next plurality of document elements using the next attributes;
   detecting a next plurality of form components using the next features;
   determining that the initial plurality of form components and the next plurality of form components are different; and
   in response to determining that the initial plurality of form components and the next plurality of form components are different:
      clustering the next plurality of form components into a next plurality of line objects of a next structured representation by applying the unsupervised machine learning model to the geometric attributes of the next plurality of document elements; and
      replacing, in the repository, the initial structured representation with the next structured representation.

2. The method of claim 1, wherein determining that the initial plurality of form components and the next plurality of form components are different comprises:
   determining that one of the next plurality of form components is a modified version of one of the initial plurality of form components.

3. The method of claim 1, wherein determining that the initial plurality of form components and the next plurality of form components are different comprises:
   determining that one of the next plurality of form components is not comprised by the initial plurality of form components.

4. The method of claim 1, wherein one of the next plurality of line objects is a modified version of one of the initial plurality of line objects.

5. The method of claim 1, wherein one of the next plurality of line objects is not comprised by the initial plurality of line objects.

6. The method of claim 1, wherein the initial document corresponds to a first jurisdiction, and wherein the next document is a version of the initial document that is adapted to a second jurisdiction different from the first jurisdiction.

7. The method of claim 1, wherein determining that the initial plurality of form components and the next plurality of form components are different comprises:
   determining that one of the initial plurality of form components is not comprised by the next plurality of form components.

8. The method of claim 1, wherein one of the initial plurality of line objects is not comprised by the next plurality of line objects.

9. A system, comprising:
   a memory coupled to a computer processor;
   a repository configured to store:
      an initial document having a document type and comprising an initial plurality of document elements and initial attributes describing the initial plurality of document elements, wherein one or more of the initial attributes are geometric attributes describing a placement of the corresponding initial document element within the initial document,
      a next document having the document type and comprising a next plurality of document elements and next attributes describing the next plurality of document elements, wherein one or more of the next attributes are geometric attributes describing a placement of the corresponding next document element within the next document,
      an initial structured representation comprising an initial plurality of form components and an initial plurality of line objects,
      a next structured representation comprising a next plurality of form components and a next plurality of line objects, and
      an unsupervised machine learning model; and
   a structured representation generator, executing on the computer processor and using the memory, configured to:
      acquire, from the initial document, the initial plurality of document elements and the initial attributes,
      derive initial features for the initial plurality of document elements using the initial attributes,
      detect the initial plurality of form components using the initial features,
      cluster the initial plurality of form components into the initial plurality of line objects by applying the unsupervised machine learning model to the geometric attributes of the initial plurality of document elements,
      acquire, from the next document, the next plurality of document elements and the next attributes,
      derive next features for the next plurality of document elements using the next attributes,
      detect the next plurality of form components using the next features,
      determine that the initial plurality of form components and the next plurality of form components are different, and
      in response to determining that the initial plurality of form components and the next plurality of form components are different:
         cluster the next plurality of form components into the next plurality of line objects by applying the unsupervised machine learning model to the geometric attributes of the next plurality of document elements, and
         replace the initial structured representation with the next structured representation.

10. The system of claim 9, wherein the structured representation generator is further configured to determine that the initial plurality of form components and the next plurality of form components are different by:
   determining that one of the next plurality of form components is a modified version of one of the initial plurality of form components.

11. The system of claim 9, wherein the structured representation generator is further configured to determine that the initial plurality of form components and the next plurality of form components are different by:
   determining that one of the next plurality of form components is not comprised by the initial plurality of form components.

12. The system of claim 9, wherein one of the next plurality of line objects is a modified version of one of the initial plurality of line objects.

13. The system of claim 9, wherein one of the next plurality of line objects is not comprised by the initial plurality of line objects.

14. The system of claim 9, wherein the initial document corresponds to a first jurisdiction, and wherein the next document is a version of the initial document that is adapted to a second jurisdiction different from the first jurisdiction.

15. The system of claim 9, wherein the structured representation generator is further configured to determine that the initial plurality of form components and the next plurality of form components are different by:
   determining that one of the initial plurality of form components is not comprised by the next plurality of form components.

16. A non-transitory computer readable medium instructions that, when executed by a computer processor, cause the computer processor to perform the operation of:
   acquiring, from an initial document having a document type, an initial plurality of document elements and initial attributes describing the initial plurality of document elements, wherein one or more of the initial attributes are geometric attributes describing a placement of the corresponding initial document element within the initial document;
   deriving initial features for the initial plurality of document elements using the initial attributes;
   detecting an initial plurality of form components using the initial features;
   clustering the initial plurality of form components into an initial plurality of line objects of an initial structured representation by applying an unsupervised machine learning model to the geometric attributes of the initial plurality of document elements;
   adding the initial structured representation to a repository;
   acquiring, from a next document having the document type, a next plurality of document elements and next attributes describing the next plurality of document elements, wherein one or more of the next attributes are geometric attributes describing a placement of the corresponding next document element within the next document;
   deriving next features for the next plurality of document elements using the next attributes;

detecting a next plurality of form components using the next features;

determining that the initial plurality of form components and the next plurality of form components are different; and in response to determining that the initial plurality of form components and the next plurality of form components are different:

clustering the next plurality of form components into a next plurality of line objects of a next structured representation by applying the unsupervised machine learning model to the geometric attributes of the next plurality of document elements; and replacing, in the repository, the initial structured representation with the next structured representation.

17. The non-transitory computer readable medium of claim 16, wherein determining that the initial plurality of form components and the next plurality of form components are different comprises:

determining that one of the next plurality of form components is a modified version of one of the initial plurality of form components.

18. The non-transitory computer readable medium of claim 16, wherein determining that the initial plurality of form components and the next plurality of form components are different comprises:

determining that one of the next plurality of form components is not comprised by the initial plurality of form components.

19. The non-transitory computer readable medium of claim 16, wherein one of the next plurality of line objects is a modified version of one of the initial plurality of line objects.

20. The non-transitory computer readable medium of claim 16, wherein one of the next plurality of line objects is not comprised by the initial plurality of line objects.

* * * * *

UNITED STATES PATENT AND TRADEMARK OFFICE
CERTIFICATE OF CORRECTION

PATENT NO. : 11,521,405 B2
APPLICATION NO. : 17/244586
DATED : December 6, 2022
INVENTOR(S) : Anu Singh et al.

It is certified that error appears in the above-identified patent and that said Letters Patent is hereby corrected as shown below:

In the Claims

At Column 18, Claim number 16, Line number 39, "… computer readable medium instructions" should read -- … computer readable medium comprising instructions --.

Signed and Sealed this
Ninth Day of January, 2024

Katherine Kelly Vidal
*Director of the United States Patent and Trademark Office*